United States Patent [19]
Fort

[11] 3,727,202
[45] Apr. 10, 1973

[54] APPLICATION OF AN AUTOMATIC PULSE WIDTH CONTROLLED, MONOSTABLE MULTIVIBRATOR FOR DETECTING PHASE ENCODED INFORMATION ON MAGNETIC TAPE

[75] Inventor: Larry W. Fort, Broken Arrow, Okla.

[73] Assignee: Telex Computer Products, Inc., Tulsa, Okla.

[22] Filed: Jan. 10, 1972

[21] Appl. No.: 216,692

Related U.S. Application Data

[63] Continuation-in-part of Ser. No. 216,534, Jan. 10, 1972.

[52] U.S. Cl. .......................................... 340/174.1 A
[51] Int. Cl. ........................... G11b 5/44, G11b 23/30
[58] Field of Search ............... 340/174.1 A, 174.1 B, 340/174.1 G, 174.1 H

[56] References Cited

UNITED STATES PATENTS

| | | | |
|---|---|---|---|
| 3,496,557 | 2/1970 | Lowrance | 340/174.1 A |
| 3,537,084 | 10/1970 | Behr | 340/174.1 A |
| 3,636,536 | 1/1972 | Norris | 340/174.1 A |

*Primary Examiner*—Vincent P. Canney
*Attorney*—Head & Johnson

[57] ABSTRACT

This invention describes an apparatus for detecting data transitions in a phase-encoded signal. It comprises a trigger means to generate trigger pulses at each signal transition in the phase-encoded signal, whether phase or data transition. The output of the trigger generator goes to an automatic pulse-width-controlled monostable multivibrator which, responsive to the trigger pulses, generates a series of pulses of constant pulse width, which occur at each data transition. This multivibrator circuit is inhibited from operating at phase transitions and so it selects the data transitions and provides uniform pulses, of a selected magnitude of the basic time period. Having selected only the data transitions to create a pulse, there is then derived from the multivibrator output in a ONES' gate a series of short positive pulses which occur at each of the data transitions which are separated by the basic time period. The output of the ONES' gate goes to a ONES' detector, which compares the polarity of the pulses from the ONES' gate with the polarity of the phase-encoded signal immediately after each data transition. Those transitions which have a positive potential then pass through the ONES' detector and are indicated as detected logical ones.

8 Claims, 6 Drawing Figures

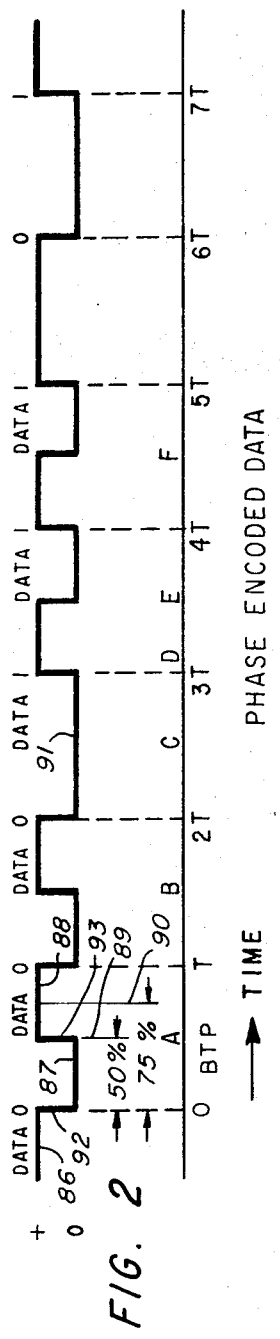
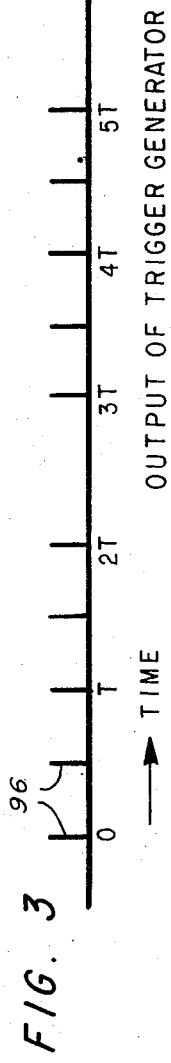
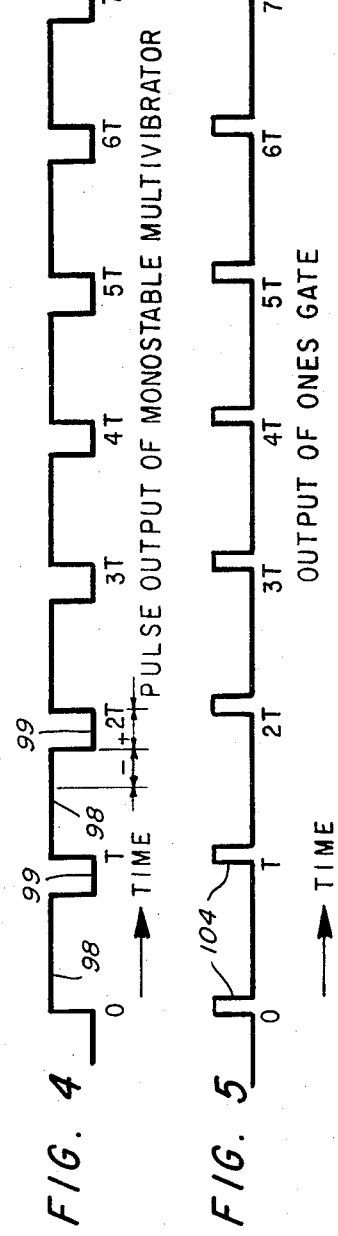
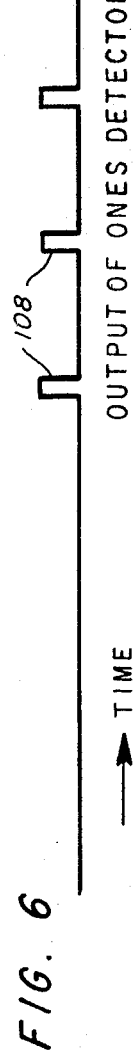

APPLICATION OF AN AUTOMATIC PULSE WIDTH CONTROLLED, MONOSTABLE MULTIVIBRATOR FOR DETECTING PHASE ENCODED INFORMATION ON MAGNETIC TAPE

CROSS REFERENCE TO RELATED APPLICATION

This application is a continuation-in-part of a copending application Ser. No. 216,534 filed on Jan. 10, 1972 by the same inventor and entitled; AUTOMATIC PULSE WIDTH CONTROL FOR A MONOSTABLE MULTIVIBRATOR.

BACKGROUND OF THE INVENTION

1. Field of the Invention

This invention is concerned with apparatus for detecting phase-encoded signals. More particularly, it is concerned with reading and detecting phase-encoded signals transcribed from magnetic tape.

2. Description of the Prior Art

While the field of application of phase-encoded signals to magnetic tape systems is relatively new, there is considerable art on apparatus for detecting phase-encoded signals. However, none of these, which are known to the inventor, have the simplicity, reliability and directness of this invention.

SUMMARY OF THE INVENTION

This invention comprises a series of subsystems which operate in the following manner: A trigger generator provides a trigger impulse which corresponds in time to each transition of the phase encoded signal whether a phase transition or a data transition. A nontriggerable monostable multivibrator accepts the trigger pulses from the trigger generator and creates a pulse width modulated signal which provides a pulse at each basic time period of the phase-encoded signal and which starts at each data transition. In other words, by making this nontriggerable except once each period, it automatically eliminates the pulses which occur at phase transitions and this pulse width signal now is an indication of data transitions. A ONES' gate takes the pulse width signal and creates a short data pulse at the beginning of each basic time period. To tell whether the data transitions are ones or zeros, it is necessary to compare the data pulses with the phase-encoded signal immediately after a data transition. When the phase-encoded signal has a positive potential which matches the positive potential of the data pulses, a ONES' detector which is an AND gate puts out a positive pulse, indicating the presence of a data one.

It is a principle object of this invention to provide a simple, direct apparatus for detecting data transitions in the phase-encoded signal.

These and other objects of this invention and a better understanding of the principles and details of the invention will be evident from the following description taken in conjunction with the appended drawings, in which:

BRIEF DESCRIPTION OF THE DRAWINGS

FIG. 2 indicates, as a function of time, a record of the phase-encoded signal.

FIG. 3 represents, as a function of time, the output pulses of the trigger generator.

FIG. 4 represents, as a function of time, the pulse output of the monostable multivibrator.

FIG. 5 represents, as a function of time, the output of the ONES' gate; and

FIG. 6 represents, as a function of time, the output of the ONES' detector.

DESCRIPTION OF THE PREFERRED EMBODIMENT

Figure 1:
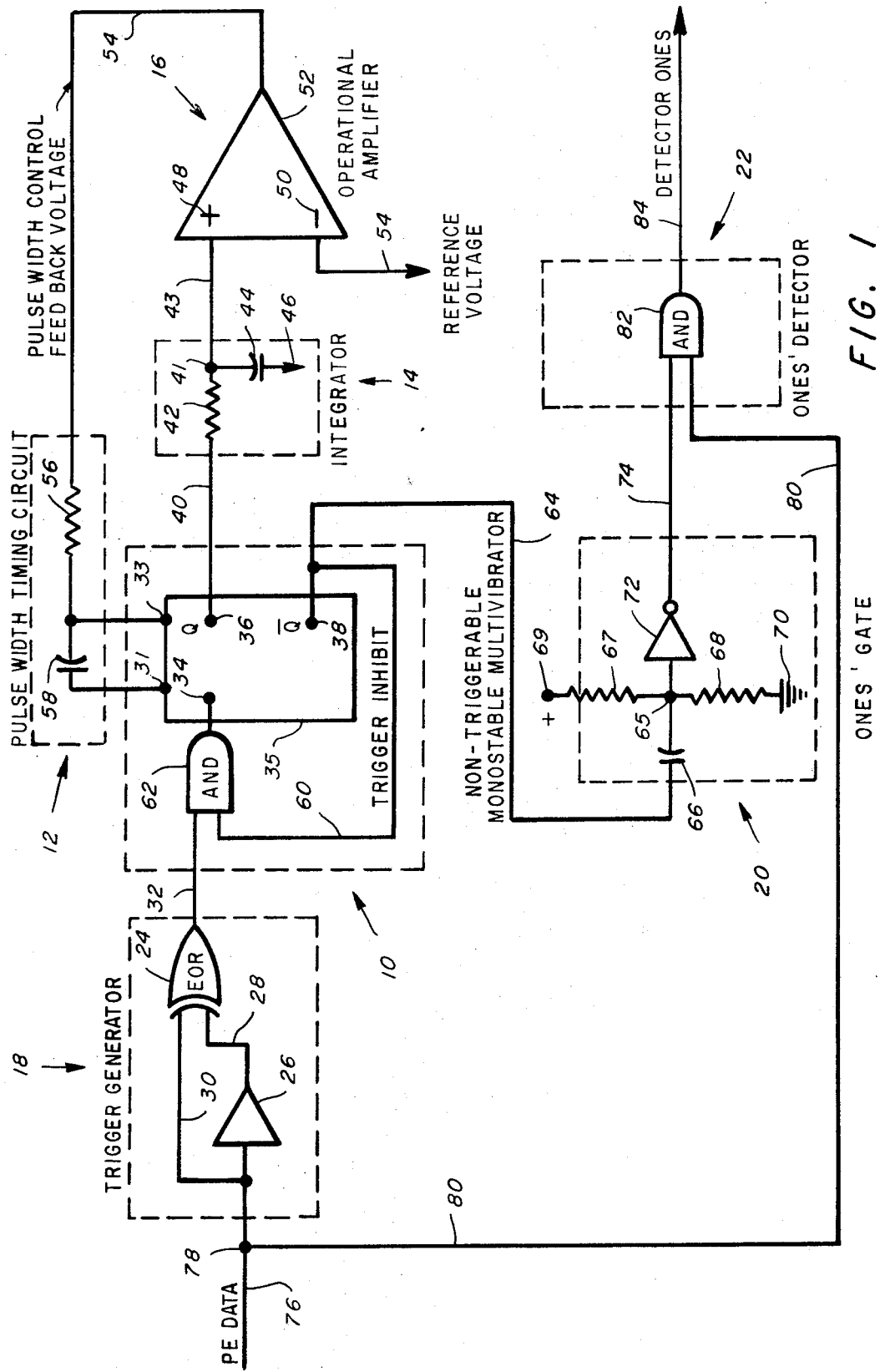
FIG. 1 represents in schematic form the preferred embodiment of this invention.

Referring now to the drawings, and in particular to FIG. 1, the numeral 18 represents generally the trigger generator; numeral 10 indicates the nontriggerable monostable multivibrator; numeral 12 indicates the timing circuit of the monostable multivibrator, which determines the pulse width; numeral 14 indicates the integrating circuit used to integrate the output of the pulses of the monostable multivibrator; numeral 16 indicates the operational amplifier which generates the error signal to control the period of the pulse width of the multivibrator; numeral 20 indicates generally the ONES' gate; and numeral 22 indicates generally the ONES' detector.

In FIG. 2 is shown a time record of the phase-encoded data. This is a square wave type of record comprised of line portion 86 at a positive potential, a data transition 92 where the potential drops from a positive to zero value at the time zero. The potential then remains zero along line 87 until a time 50 percent of the basic time period, T. At the half point of the period T there is a phase transition in which the polarity is reversed, rising from zero to a positive voltage along line 93 where the potential remains positive along line 88 until the end of the period to time T, when there is another data transition down to zero potential and so on.

The important characteristic of the phase-encoded signal is that it is a pulsating square wave signal that varies between a positive voltage and zero voltage. The changes from positive to zero, or from zero to positive are called transitions. There is a "data" transition once each basic time period. There may be, or may not be, a "phase" transition at the 50 percent point between data transitions. Data transitions can be of two kinds. A logical "zero" transition involves a change in potential from positive to zero. A logical "one" transition involves a change in potential from zero to positive. Thus, in FIG. 2 there are phase transitions at A, B, E and F. There are data transitions at times O, T, 2T, 3T, 4T and etc. Those data transitions at O, T, 2T and 6T are logical zero transitions, while those at 3T, 4T, 5T and 7T are logical one transitions. The problem of a system for detecting phase-encoded data resolves itself into detecting the presence of logical one transitions.

Farther along the trace, line 91 fails to show a phase transition in the middle of the period. It will be seen, therefore, that at the beginning of that period the data transition is from a positive value to zero, that is, in a negative direction that indicates a data zero. At the end of that period the transition is from zero to a positive value that indicates, by convention, a data one. Then again, in the next period, there is a phase transition, and at the end of that period a data transition again to the positive direction which represents a logical one. The next data transition is one and then in the following period again there is no phase transition and the data transition following that is a zero, going from a positive value to a zero value.

It is clear then that what is required in the process of detection of a phase-encoded signal is to determine at what instant there is a data transition and to determine whether that transition is from a positive to a zero value or whether that transition is from a zero to a positive value. If it is a negative transition it is by convention called a data zero, and if it is in a positive direction it is a data one. The object of the entire apparatus therefore is to determine which of the data transitions are zeros and which are ones.

The first step in the process of detaching the phase-encoded data is to generate a trigger pulse at each transition, whether it be a data or phase transition. This is represented in the time trace of FIG. 3 where at each transition there is a short duration positive pulse. The trace of FIG. 3 is provided by the trigger generator shown generally by the numeral 18. This comprises an exclusive OR gate (FOR) 24 which has two inputs. Its operation is such that when the two inputs are of opposite polarity, it will put out a short pulse. When they are of the same polarity, then it will not put out a pulse. Input line 30 is connected to junction 78, at which point the phase-encoded data enters the system along line 76. The second lead to the EOR gate 24 is lead 28 which comes from the output of an amplifier 26 whose input is also connected to junction 78.

Operation of the trigger generator is as follows: When there is a transition from positive to negative or from negative to positive, the lead 30 transmits this transition instantly to the gate 24. However, the amplifier 26, even though it is a broad band amplifier, will have a short time delay, which may be a very small fraction of a microsecond. During the period that it dealys, there is then presented to the gate 24 two signals of different polarity. Line 30 has changed polarity instantly, line 28 still has not changed, and therefore, this condition produces a short positive pulse on line 32 which goes into the nontriggerable monostable multivibrator circuit indicated generally by numeral 10. The signal on line 32 is shown schematically as pulses 96 on the time curve of FIG. 3.

The amplifier 26 is used, not as an amplifier, but simply as a circuit that has inherent time delay of a small magnitude. It will therefore be clear that there are many other circuits, elements and assemblies which have a similar inherent delay which could be used in place of amplifier 26 in this circuit.

The monostable multivibrator 35 has an input terminal 34, and output "Q" terminal 36, an output "Q" terminal 38, and two terminals 31 and 33, which go to a pulse-width timing circuit, indicated generally by the numeral 12. The monostable multivibrator circuit 10, the integrator circuit 14, the operational amplifier 16 and the pulse-width timing circuit 12 together form an automatic pulse width control for a monostable multivibrator. This subsystem composed of elements 10, 12, 14, 16, is the subject of a copending application that has the title "AUTOMATIC PULSE WIDTH CONTROL FOR A MONOSTABLE MULTIVIBRATOR," of which this application is a continuation-in-part, and which application is incorporated into this application by reference.

Reference is made to the copending application for full details on this subsystem. However, the circuit will be described briefly as follows: As the multivibrator 35 is triggered, it moves from a stable condition to an unstable condition in which the "Q" terminal 36 goes from a zero to a positive voltage, while the "Q" terminal 38 goes from a positive to a zero voltage. Then, at a later time, determined by the charging current to the capacitor 58 connected between terminals 31 and 33 and the resistor 56 and the error signal from the operational amplifier 52, the multivibrator returns from the unstable condition to its original stable state or condition.. During the unstable condition after it has been triggered, the positive voltage V on terminal 36 is supplied through lead 40 to the integrator 14. This integrator composed of the series resistor 42 and shunt capacitor 44 to ground 46, with a common junction 41. When the multivibrator 35 returns to its stable condition and the potential of terminal 36 goes back to zero, the capacitor 44 which has been charged to some intermediate potential between zero and V, discharges through the resistor 42 to ground. On the next trigger cycle it is charged again by the voltage V on 36, and then is discharged again. After a number of cycles there will be an average voltage on the junction 41 which will be of some value, which is a function of the duty cycle, or the width of the pulse on terminal 36 as a fraction of the period T of the oscillation.

The operational amplifier then compares the average voltage at the junction 41 with the reference voltage at 54. Any difference in voltage is passed as an error signal along line 54 to the pulse-width timing circuit 12.

If the voltage at 41 is higher than the reference voltage, the error voltage will be higher, and this will cause the capacitor 58 to charge more rapidly, and therefore the multivibrator will drop back to its stable state more quickly. That means there will be less charging time of the capacitor 44 and more discharging time, and therefore the voltage at 41 will drop. Eventually the average voltage at junction 41 will be the same as the reference voltage, and the pulse width will be a fixed percentage of the period, which percentage will be a function of this reference voltage.

Earlier, it was stated that the trigger generator will produce a positive pulse at each transition, whether in a positive or a negative direction, or whether it represents a data or a phase transition. The trigger inhibit feature is important in separating the phase transitions from the data transitions. This comprises a lead 60 from the "Q" terminal 38 to one input of the AND gate 62 connected to the input 34 of the multivibrator. When the multivibrator is in a stable state, there is a zero potential on terminal 36 and a positive potential 38. This positive potential enables the AND gate 62 so that when a trigger impulse arrives on lead 32, the AND gate triggers, putting a positive potential on input terminal 34 of the multivibrator. This triggers the multivibrator which then changes to its unstable state, and places a positive potential on terminal 36 and a zero potential on 38. This zero potential communicated to the AND gate 62 inhibits the operation of the gate 62 until the multivibrator has returned again to its stable condition.

If trigger pulses can only occur at the beginning and end of each basic time period and possibly at half periods, there is no possibility of a triggering at half period with this trigger inhibit. Therefore, there will only be one pulse out of the multivibrator, each basic time period, which will last a fraction of a basic time period determined by the magnitude of the reference voltage. The adjustment that is desired is that the pulse last for a time of approximately 75 percent of the basic time period of the phase-encoded data. By this means, should there by any variation in basic time period or in the action of the multivibrator, there is a maximum leeway of 25 percent of the basic time period for possible error, without upsetting the whole operation of the detector. Therefore, over lead 40 that comes from terminal 36, there is an output pulse which is shown in FIG. 4 and nominally comprises a positive portion 98 of 75 percent of the basic time period in duration, and a zero portion 99 of approximately 25 percent of the basic time period.

This is a unique system which adjusts itself to start the pulse 98 always at a data transition and not at a phase transition. Consider, for example, that in initiating this operation the multivibrator is tripped at the phase transition A of FIG. 2. Then the trigger inhibit will prevent any triggering until one period later at the transition B, which is also a phase transition. Similarly, no triggering is possible until time C, which would be the position of the next phase transition. However, there is no phase transition there because there is to be a data one transition at 3T, or at transition D. Consequently, there is no triggering at C and the triggering waits until D, at a data one transition. It could equally well be a data zero transition, but the point is that the first data transition where there is a change from a data zero to a positive voltage or vice versa, the system sets itself in synchronism with the data transition times. Thereafter, it can be triggered only at a data transitions. Therefore, in FIG. 4 there are a series of pulses, with a period of repetition equal to the basic time period. From this series of pulses there can be generated, as in FIG. 5, a series of pulses 104, which occurs at each data transition.

This is done in the network represented by the numeral 20, called a ONES' gate. A lead 64 from terminal 38 of the multivibrator goes to a capacitor 66 and to a point on a potentiometer which is supplied with positive voltage at 69 and is grounded at the other end 70. The values of resistances 67 and 68 are such as to provide a nominal voltage of about 3 volts at the junction 65. The inverting amplifier 72 has an input connected to the junction 65 and output lead 74. Each time there is an operation of the multivibrator the potential of 38 drops from a positive to a zero value. This drop of voltage impressed on the capacitance of 66 drops the junction point 65 to a lower potential. This lower potential applied to the inverting amplifier 72 puts out a positive potential pulse on lead 74. The pulses on lead 74 are shown in FIG. 5 as pulses 104 spaced apart by the period T and occurring at the time of a data transition. The multivibrator and the ONES' gate have sorted out of all the transitions, those which are data transitions, and have created the pulses 104, occurring at the time of each data transition. The next step that is required is a very simple one, and that is to determine whether the transition is from a positive to a negative potential or vice versa. A positive to a negative potential would represent a logical zero, and a negative to a positive would represent a logical one. The detection of the ones is carried out in the subsystem 22 the ONES' detector, and this is simply an AND gate 82. One input lead 74 goes to the output of the ONES's gate, and the other lead goes to junction 78, at which is presented the phase-encoded data. If the transition is from a negative to a positive value, then the polarity of line 80 will be positive immediately after the transition and, of course, the pulses on line 74 are all positive. Thus, with the two inputs positive, the output of the gate 82 will be a positive pulse on line 84 and this is shown as pulses 108 on the curve of FIG. 6.

Recapitulating what has been described, this invention involves the generating of a trigger pulse at each transition in the phase-encoded data; separating from this stream of trigger pulses those that correspond to the phase transitions; generating a positive pulse at each data transition trigger pulse; and comparing this series of positive pulses at each data transition with the polarity of the phase-encoded signal immediately after each data transition in order to determine which data transitions comprise logical ones.

While this invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency of which each element or step thereof is entitled.

What is claimed:

1. In a magnetic tape system for detecting phase-encoded information, including means to transport a magnetic tape bearing phase-encoded information past a read means to convert said information into phase-encoded signals, the improvement comprising:
   a. means responsive to said phase-encoded signals to generate a trigger pulse at each data and phase transition of said phase-encoded signals;
   b. means responsive to said trigger pulses to generate a constant pulse-width signal of period equal to the basic timing period of said data transition trigger pulses, and of pulse width range of 51 to 99 percent of the basic timing period, said pulses being generated only at each data transition;
   c. means responsive to said constant pulse width signal to generate a positive detection pulse at each data transition; and
   d. means to compare the polarity of said phase-encoded signal immediately after each data transition with the polarity of said detection pulses, and to generate an output signal each time the polarity of said phase-encoded data matches the polarity of said detection pulses.

2. The magnetic tape system as in claim 1 in which said means to generate trigger pulses comprises an exclusive OR gate, one input of which is connected directly to the source of phase-encoded signal, and the second input of which is connected to the source of phase-encoded signal through a signal delay means;
   whereby at each voltage transition of said phase-encoded signal there will be a delay in the change of signal in one input lead while the other input lead will change immediately,
   whereby during the delay period two input signals will be of different polarities and said EOR gate will generate a trigger pulse.

3. The magnetic tape system as in claim 1 in which said delay means comprises an amplifier.

4. The magnetic tape system as in claim 1 in which said means to generate a constant pulse width signal is a non-triggerable monostable multivibrator with its "Q" output connected to an integrating circuit, a comparision operational amplifier with its positive input connected to the output of said integrating circuit, its negative input connected to a reference voltage, the output of said operational amplifier connected through a resistor to the timing capacitor of said multivibrator.

5. The magnetic tape system as in claim 1 in which the pulse width of said pulses is approximately equal to 75 percent of said basic timing period.

6. The magnetic tape system as in claim 1 in which said means to generate a positive detection pulse comprises a capacitor with a first terminal connected to the "Q" terminal of said multivibrator, and its second terminal connected to a potentiometer intermediate its first end carrying a positive potential, and its second end at ground potential; said second terminal also connected to the input of an inverting amplifier.

7. The magnetic tape system as in claim 1 in which said means to compare and to generate comprises an AND gate with its first input connected to the output of said inverting amplifier, and its second input connected to said source of phase-encoded signals.

8. Apparatus for detecting a phase-encoded signal comprising:
   a. means to generate trigger pulses at each signal transition in the phase-encoded signal;
   b. means to eliminate from the series of trigger pulses those due to phase transitions of the phase-encoded signal;
   c. means for generating data pulses by each of the remaining trigger pulses which correspond in time to data transitions;
   d. means for comparing said data pulses with said phase-encoded signal after each data transition; and
   e. means for generating an output signal whenever said data pulses correspond in polarity to the phase-encoded signal.

* * * * *